United States Patent
Kobayashi et al.

(10) Patent No.: US 11,104,787 B2
(45) Date of Patent: Aug. 31, 2021

(54) POLYTETRAFLUOROETHYLENE AQUEOUS DISPERSION

(71) Applicants: AGC INC., Chiyoda-ku (JP); AGC Chemicals Europe, Limited, Lancashire (GB)

(72) Inventors: Shigeki Kobayashi, Chiyoda-ku (JP); Masahiro Takazawa, Chiyoda-ku (JP); Ariana Claudia Morgovan-Ene, Lancashire (GB); Anthony Eugene Wade, Lancashire (GB); Diane Caine, Lancashire (GB)

(73) Assignees: AGC INC., Chiyoda-ku (JP); AGC Chemicals Europe, Limited, Lancashire (GB)

( * ) Notice: Subject to any disclaimer, the term of this patent is extended or adjusted under 35 U.S.C. 154(b) by 61 days.

(21) Appl. No.: 16/661,064

(22) Filed: Oct. 23, 2019

(65) Prior Publication Data

US 2020/0056031 A1 Feb. 20, 2020

Related U.S. Application Data

(63) Continuation of application No. PCT/JP2018/016476, filed on Apr. 23, 2018.

(30) Foreign Application Priority Data

Apr. 28, 2017 (JP) .............................. JP2017-090702

(51) Int. Cl.
| | | |
|---|---|---|
| *C08L 27/18* | (2006.01) | |
| *C09D 7/20* | (2018.01) | |
| *C09D 7/45* | (2018.01) | |
| *C08F 214/26* | (2006.01) | |
| *C08J 5/18* | (2006.01) | |
| *C08J 5/24* | (2006.01) | |
| *C09D 127/18* | (2006.01) | |

(52) U.S. Cl.
CPC ............ *C08L 27/18* (2013.01); *C08F 214/26* (2013.01); *C08J 5/18* (2013.01); *C08J 5/24* (2013.01); *C09D 7/20* (2018.01); *C09D 7/45* (2018.01); *C09D 127/18* (2013.01); *C08F 2800/20* (2013.01); *C08J 2327/18* (2013.01); *C08J 2483/12* (2013.01); *C08L 2201/50* (2013.01); *C08L 2203/12* (2013.01); *C08L 2203/16* (2013.01); *C08L 2207/322* (2013.01)

(58) Field of Classification Search
CPC ................. C08L 27/18; C08L 2201/50; C08L 2207/322; C08L 2203/16; C08L 2203/12; C08F 214/26; C08F 2800/20; C08J 5/18; C08J 5/24; C08J 2483/12; C08J 2327/18; C09D 127/18; C09D 7/20; C09D 7/45
USPC ......................................................... 524/320
See application file for complete search history.

(56) References Cited

U.S. PATENT DOCUMENTS

2008/0214714 A1* 9/2008 Hoshikawa ......... C08L 2666/22
524/319

FOREIGN PATENT DOCUMENTS

| WO | WO 2007/046482 A1 | 4/2007 |
|---|---|---|
| WO | WO 2018/097141 A1 | 5/2018 |

OTHER PUBLICATIONS

International Search Report dated Jul. 24, 2018 in PCT/JP2018/016476, filed on Apr. 23, 2018.

* cited by examiner

*Primary Examiner* — Hui H Chin
(74) *Attorney, Agent, or Firm* — Oblon, McClelland, Maier & Neustadt, L.L.P.

(57) ABSTRACT

To provide a PTFE aqueous dispersion which is excellent in mechanical stability, while being not susceptible to foaming. A polytetrafluoroethylene aqueous dispersion which is characterized by containing from 15 to 70 mass % of PTFE particles having an average primary particle diameter of from 0.1 to 0.5 μm; from 0.1 to 20,000 ppm, to the PTFE particles, of a fluorinated emulsifier selected from a $C_{4-7}$ fluorinated carboxylic acid which may have an etheric oxygen atom, and salts of thereof; from 1 to 20 parts by mass, to 100 parts by mass of the PTFE particles, of a nonionic surfactant represented by $R^1$—O-A-H (wherein $R^1$ is a $C_{8-18}$ alkyl group, and A is a polyoxyalkylene chain); from 0.004 to 0.040 parts by mass, to 100 parts by mass of the PTFE particles, of a polyether polysiloxane copolymer, wherein the polyether chain consists solely of a polyoxypropylene group; and water.

13 Claims, 1 Drawing Sheet

(a) 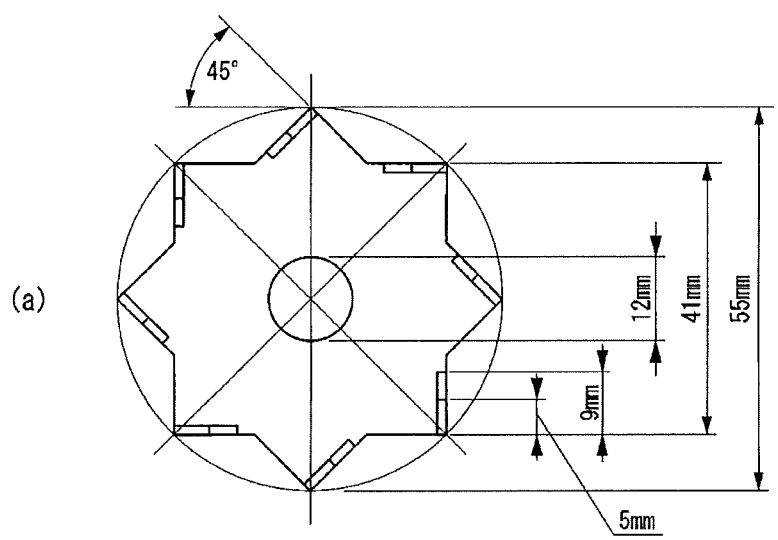
(b) 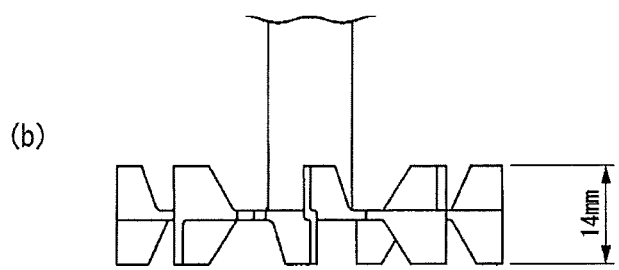

POLYTETRAFLUOROETHYLENE AQUEOUS DISPERSION

TECHNICAL FIELD

The present invention relates to a polytetrafluoroethylene (hereinafter referred to as PTFE) aqueous dispersion.

BACKGROUND ART

Usually PTFE is produced by an emulsion polymerization method of polymerizing tetrafluoroethylene (hereinafter referred to as TFE) in an aqueous medium by using an emulsifier. According to the emulsion polymerization method, an aqueous emulsion having PTFE particles dispersed in the aqueous medium is obtainable. The aqueous emulsion has a low viscosity, is unstable and is likely to form agglomerates.

In Patent Document 1, a method is disclosed wherein such an aqueous emulsion is stabilized by adding thereto a nonionic surfactant as a dispersing agent and optionally concentrated, to obtain a PTFE aqueous dispersion having good mechanical stability.

Such a PTFE aqueous dispersion may be used, for example, in a method of impregnating, coating or screen printing on a substrate in the form of an aqueous dispersion. Further, in the form of a coating material made to have a high viscosity by adding a thickening agent or surface modifier, it may be used to form a relatively thick coating film.

PRIOR ART DOCUMENT

Patent Document

Patent Document 1: WO 2007/046482

DISCLOSURE OF INVENTION

Technical Problem

According to the findings by the present inventors, the PTFE aqueous dispersion obtainable by the method disclosed in Patent Document 1 is good in mechanical stability in spite of the viscosity being low, but may sometimes have a problem of foaming at the time of receiving a shear force of e.g. stirring, and an improvement is required.

The present invention has an object to provide a PTFE aqueous dispersion which is excellent in mechanical stability and at the same time, is unlikely to undergo foaming.

Solution to Problem

The present invention provides a PTFE aqueous dispersion having constructions as defined in the following [1] to [13].

[1] A polytetrafluoroethylene aqueous dispersion characterized by containing from 15 to 70 mass % of polytetrafluoroethylene particles having an average primary particle size of from 0.1 to 0.5 µm, from 0.1 to 20,000 ppm, to the mass of the polytetrafluoroethylene particles, of a fluorinated emulsifier selected from the group consisting of a $C_{4-7}$ fluorinated carboxylic acid which may have an etheric oxygen atom, and salts thereof, from 1 to 20 parts by mass, to 100 parts by mass of the polytetrafluoroethylene particles, of a nonionic surfactant represented by the following formula (1), from 0.004 to 0.040 parts by mass, to 100 parts by mass of the polytetrafluoroethylene particles, of a polyether polysiloxane copolymer having a polysiloxane chain and a polyether chain, wherein the polyether chain consists solely of a polyoxypropylene group, and water,

wherein $R^1$ is a C8-18 alkyl group, and A is a polyoxyalkylene chain composed of oxyethylene groups in the average repeating number of from 5 to 20 and oxypropylene groups in the average repeating number of from 0 to 2.

[2] The polytetrafluoroethylene aqueous dispersion according to [1], which contains from 0.001 to 0.010 parts by mass, to 100 parts by mass of the polytetrafluoroethylene particles, of a mineral oil.

[3] The polytetrafluoroethylene aqueous dispersion according to [1] or [2], which contains from 0.005 to 0.050 parts by mass, to 100 parts by mass of the polytetrafluoroethylene particles, of a compound represented by the following formula (2),

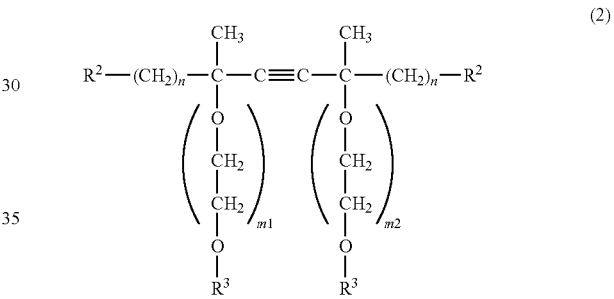

wherein $R^2$ represents a $C_{2-4}$ alkyl group, $R^3$ represents a $C_{1-12}$ alkyl group, n is 1 or 2, $m_1$ and $m_2$ each independently represent the average repeating number of oxyethylene groups, and the sum of $m_1$ and $m_2$ is from 2 to 35.

[4] The polytetrafluoroethylene aqueous dispersion according to any one of [1] to [3], wherein the fluorinated emulsifier is a fluorinated emulsifier selected from the group consisting of a $C_{4-7}$ fluorinated carboxylic acid which has from 1 to 4 etheric oxygen atoms, and salts thereof.

[5] The polytetrafluoroethylene aqueous dispersion according to any one of [1] to [4], wherein in the formula (1), the number of carbon atoms in $R^1$ is from 10 to 16, and A is a polyoxyalkylene chain composed of oxyethylene groups in the average repeating number of from 7 to 12 and oxypropylene groups in the average repeating number of from 0 to 2.

[6] The polytetrafluoroethylene aqueous dispersion according to any one of [1] to [5], which contains the nonionic surfactant represented by the formula (1) in an amount of from 1 to 20 parts by mass to 100 parts by mass of the polytetrafluoroethylene particles.

[7] The polytetrafluoroethylene aqueous dispersion according to any one of [1] to [6], wherein the polytetrafluoroethylene particles are particles of a non-melt-moldable polytetrafluoroethylene.

[8] The polytetrafluoroethylene aqueous dispersion according to [7], wherein the particles of a non-melt-moldable polytetrafluoroethylene are particles of a modified polytetrafluoroethylene which is a copolymer of tetrafluoroethylene and a copolymerizable comonomer.

[9] The polytetrafluoroethylene aqueous dispersion according to [8], wherein the comonomer is a (perfluoroalkyl) ethylene wherein the number of carbon atoms in the perfluoroalkyl moiety is at most 8.

[10] The polytetrafluoroethylene aqueous dispersion according to any one of [7] to [9], wherein the polytetrafluoroethylene particles are particles of a modified polytetrafluoroethylene wherein the content of structural units based on a comonomer to all structural units is at most 0.5 mass %.

[11] The polytetrafluoroethylene aqueous dispersion according to any one of [1] to [10], wherein the polyether polysiloxane copolymer is at least one member selected from compounds represented by the following formulae (3) to (5),

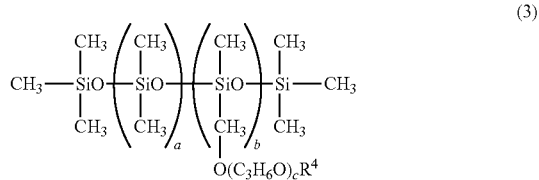

(3)

wherein $R^4$ represents a hydrogen atom or a $C_{1-12}$ alkyl group, a, b and c each represent the average repeating number, a is from 0 to 2, b is from 1 to 3, and c is from 16 to 60,

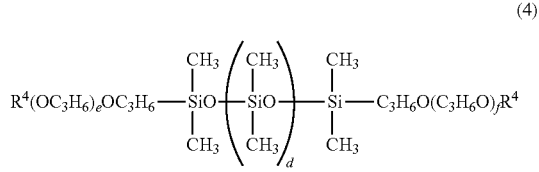

(4)

wherein $R^4$ represents a hydrogen atom or a $C_{1-12}$ alkyl group, d, e and f each represent the average repeating number, d is from 1 to 3, and the sum of e and f is from 16 to 50,

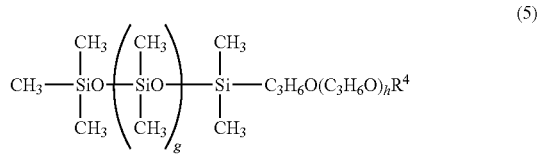

(5)

wherein $R^4$ represents a hydrogen atom or a $C_{1-12}$ alkyl group, g and h each represent the average repeating number, g is from 1 to 3, and h is from 16 to 60.

[12] The polytetrafluoroethylene aqueous dispersion according to any one of [1] to [11], which contains the polyether polysiloxane copolymer in an amount of from 0.005 to 0.040 parts by mass to 100 parts by mass of the polytetrafluoroethylene particles.

[13] The polytetrafluoroethylene aqueous dispersion according to any one of [1] to [12], which has a viscosity at 23° C. of from 3 to 300 mPa·s.

Advantageous Effects of Invention

The PTFE aqueous dispersion of the present invention is excellent in mechanical stability, and at the same time has a characteristic of being less likely to undergo foaming. Less likely to undergo foaming in the present invention means not being bubbled, or even if bubbled, bubbles will readily disappear. Hereinafter, less likely to undergo foaming will be referred to also as a low foaming property.

BRIEF DESCRIPTION OF DRAWINGS

FIG. 1 shows a stirring blade used for evaluation of the mechanical stability and the low foaming property, wherein (a) is a plan view as viewed from above, and (b) is a side view.

DESCRIPTION OF EMBODIMENTS

The following terms have the following meanings.

The "average primary particle size" means the median diameter on volumetric basis when the particle size of the PTFE particles in the PTFE aqueous dispersion was measured by a laser scattering particle size distribution analyzer.

The "standard specific gravity (hereinafter referred to also as SSG)" is an index for the molecular weight of PTFE, and it means that the molecular weight is smaller as this value is larger. The measurement is carried out in accordance with ASTM D1457-91a, D4895-91a.

The viscosity of the PTFE aqueous dispersion is a value measured by a Brookfield type viscometer using No. 1 spindle at a rotational speed of 60 rpm at a temperature of 23° C.

The "ppm" as a unit for the content is by mass.

The "modified PTFE" means a TFE polymer obtained by copolymerizing a comonomer to TFE to such an extent that does not cause melt-moldability.

The "non-melt-moldability" means that it is not melt-moldable, i.e. it shows no melt fluidity. Specifically, it means that the melt flow rate as measured in accordance with ASTM D3307 at a measurement temperature of 372° C. under a load of 49N is less than 0.5 g/10 min.

<PTFE Particles>

In the present invention, PTFE particles are particles of a TFE polymer with non-melt-moldability and have a meaning to include both particles of TFE homopolymer and particles of modified PTFE.

The comonomer to be used for the production of a modified PTFE may be hexafluoropropylene (HFP), a perfluoro(alkyl vinyl ether), chlorotrifluoroethylene, a (perfluoroalkyl) ethylene, vinylidene fluoride, a perfluoro(alkenyl vinyl ether), a perfluoro (2,2-dimethyl-1,3-dioxole), a perfluoro(4-alkyl-1,3-dioxole), etc. As the comonomer, one type may be used alone, or two or more types may be used in combination.

As the comonomer, preferred is a (perfluoroalkyl) ethylene wherein the number of carbon atoms in the perfluoroalkyl moiety is at most 8, and more preferred is a (perfluoroalkyl) ethylene wherein the number of carbon atoms in the perfluoroalkyl moiety is from 2 to 6. In particular, a (perfluoroalkyl) ethylene selected from the group consisting of (perfluoroethyl) ethylene, (perfluorobutyl) ethylene and (perfluorohexyl) ethylene, is preferred.

The content of structural units based on the comonomer in the modified PTFE is preferably at most 0.5 mass %, more preferably at most 0.4 mass %, to all structural units.

In the production of a modified PTFE, the total amount of TFE and a comonomer to be consumed in the copolymerization reaction of TFE and the comonomer, is approximately equal to the amount of the modified PTFE to be produced.

The average primary particle size of the PTFE particles is from 0.1 to 0.5 µm, preferably from 0.18 to 0.45 µm, particularly preferably from 0.20 to 0.35 µm. If the average primary particle size is smaller than 0.1 µm, there may be a case where cracking occurs in the coating layer, and if it is larger than 0.5 µm, sedimentation of PTFE particles in the PTFE aqueous dispersion tends to be too fast, such being undesirable from the viewpoint of storage stability.

The standard specific gravity (SSG) of PTFE is preferably at least 2.14 and less than 2.22, more preferably from 2.15 to 2.21. When SSG is within the above range, good mechanical properties of PTFE in the final product can be easily obtained.

The content of the PTFE particles in the PTFE aqueous dispersion is from 15 to 70 mass %, preferably from 18 to 70 mass %, more preferably from 20 to 70 mass %.

If the content of the PTFE particles is less than 15 mass %, the viscosity of the PTFE aqueous dispersion tends to be too low, and the PTFE particles are likely to sediment, whereby the storage stability tends to be poor. Further, if the content of the PTFE particles is greater than 70 mass %, the fluidity tends to be insufficient, and the handling efficiency in the next step tends to be poor. For example, when the next step is an impregnation step, impregnation tends to be insufficient, or when the next step is a mixing step, dispersibility tends to be low.

<Fluorinated Emulsifier>

The PTFE aqueous dispersion contains a fluorinated emulsifier selected from the group consisting of a $C_{4-7}$ fluorinated carboxylic acid which may have an etheric oxygen atom, and salts thereof. Here, the number of carbon atoms refers to the total number of carbon atoms per molecule. The PTFE aqueous dispersion may contain two or more types of the fluorinated emulsifier.

Part or all of the fluorinated emulsifier may be the emulsifier used in the process of producing PTFE by an emulsion polymerization method.

The fluorinated emulsifier is preferably a fluorinated emulsifier selected from the group consisting of a $C_{4-7}$ fluorinated carboxylic acid which has an etheric oxygen atom, and salts thereof.

Said fluorinated carboxylic acid which has an etheric oxygen atom is a $C_{4-7}$ compound which has an etheric oxygen atom in the middle of the carbon chain of the main chain and which has —COOH at the terminal. —COOH at the terminal may be in the form of a salt. The number of etheric oxygen atoms present in the middle of the main chain is at least 1, preferably from 1 to 4, more preferably 1 or 2. The number of carbon atoms is preferably from 5 to 7.

Specific preferred examples of the fluorinated carboxylic acid may be $C_2F_5OCF_2CF_2OCF_2COOH$, $C_3F_7OCF_2CF_2OCF_2COOH$, $CF_3OCF_2OCF_2OCF_2OCF_2COOH$, $CF_3O(CF_2CF_2O)_2CF_2COOH$, $CF_3CF_2O(CF_2)_4COOH$, $CF_3CFHO(CF_2)_4COOH$, $CF_3OCF(CF_3)CF_2OCF(CF_3)COOH$, $CF_3O(CF_2)_3OCF(CF_3)COOH$, $CF_3O(CF_2)_3OCHFCF_2COOH$, $C_4F_9OCF(CF_3)COOH$, $C_4F_9OCF_2CF_2COOH$, $CF_3O(CF_2)_3OCF_2COOH$, $CF_3O(CF_2)_3OCHFCOOH$, $CF_3OCF_2OCF_2OCF_2COOH$, $C_4F_9OCF_2COOH$, $C_3F_7OCF_2CF_2COOH$, $C_3F_7OCHFCF_2COOH$, $C_3F_7OCF(CF_3)COOH$, $CF_3CFHO(CF_2)_3COOH$, $CF_3OCF_2CF_2OCF_2COOH$, $C_2F_5OCF_2CF_2COOH$, $C_3F_7OCHFCOOH$, $CF_3OCF_2CF_2COOH$, $CF_3(CF_2)_4COOH$, $C_5F_{11}COOH$, and $C_6F_{13}COOH$.

More preferred examples may be $C_2F_5OCF_2CF_2OCF_2COOH$, $CF_3O(CF_2)_3OCF_2COOH$, $CF_3OCF(CF_3)CF_2OCF(CF_3)COOH$, $CF_3O(CF_2)_3OCF_2CF_2COOH$, $CF_3O(CF_2)_3OCHFCF_2COOH$, $C_4F_9OCF(CF_3)COOH$, and $C_3F_7OCF(CF_3)COOH$.

The salt of the fluorinated carboxylic acid may be a Li salt, a Na salt, a K salt, a $NH_4$ salt, etc.

A more preferred fluorinated emulsifier is a $NH_4$ salt (ammonium salt) of the fluorinated carboxylic acid. In the case of the ammonium salt, the solubility in an aqueous medium will be excellent, and there will be no possibility that the metal ion component will remain as an impurity in PTFE.

$C_2F_5OCF_2CF_2OCF_2COONH_4$ (hereinafter referred to as EEA) is particularly preferred.

The content of the fluorinated emulsifier in the PTFE aqueous dispersion is from 0.1 to 20,000 ppm, preferably from 0.1 to 10,000 ppm, more preferably from 0.1 to 1,000 ppm, further preferably from 0.1 to 100 ppm, particularly preferably from 0.1 to 50 ppm, most preferably from 0.1 to 10 ppm, to the mass of the PTFE particles.

When the content of the fluorinated emulsifier is at most the upper limit value in the above range, flowability of the PTFE aqueous dispersion is good and handling efficiency in the next step will be good. When it is at least the lower limit value in the above range, good dispersibility of the PTFE particles will be obtained. From such a viewpoint that foaming will be less likely to occur, the content of the fluorinated emulsifier is preferably small.

<Nonionic Surfactant>

In the present invention, the PTFE aqueous dispersion contains a nonionic surfactant represented by the following formula (1). The nonionic surfactant contributes to dispersion stability of the PTFE aqueous dispersion.

$$R^1\text{—O-A-H} \qquad (1)$$

In the formula (1), $R^1$ is a $C_{8-18}$ alkyl group. The number of carbon atoms in $R^1$ is preferably from 10 to 16, more preferably from 12 to 16. When the number of carbon atoms in $R^1$ is at most 18, good dispersion stability of the PTFE aqueous dispersion is readily obtainable. If the number of carbon atoms in $R^1$ exceeds 18, handling tends to be difficult, since the flow temperature is high. If the number of carbon atoms in $R^1$ is smaller than 8, the surface tension of the PTFE aqueous dispersion becomes high, and the permeability or wettability tends to be low.

A is a polyoxyalkylene chain composed of oxyethylene groups in the average repeating number of from 5 to 20 and oxypropylene groups in the average repeating number of from 0 to 2, and it is a hydrophilic group. In a case where the average repeating number of oxypropylene groups is more than 0, the oxyethylene groups and the oxypropylene groups in A may be arranged in a block form, or may be arranged in a random form.

From the viewpoint of the viscosity and stability of the PTFE aqueous dispersion, preferred is a polyoxyalkylene chain composed of oxyethylene groups in the average repeating number of from 7 to 12 and oxypropylene groups in the average repeating number of from 0 to 2. It is particularly preferred that A has from 0.5 to 1.5 oxypropylene groups on average, since the low foaming property is thereby good.

A nonionic surfactant (1a) is preferred wherein in the formula (1), the number of carbon atoms in $R^1$ is from 10 to 16, and A is a polyoxyalkylene chain composed of oxyethylene groups in the average repeating number of from 7 to 12 and oxypropylene groups in the average repeating number of from 0 to 2.

Commercial products of the nonionic surfactant (1a) may be TERGITOL (registered trademark) TMN100X manufactured by Dow Chemical Company, TERGITOL (registered trademark) 15S series manufactured by Dow Chemical Company, LIONOL (registered trademark) TD series manufactured by Lion Corporation, etc.

Specific examples of the nonionic surfactant may be $C_{13}H_{27}$—O—$(C_2H_4O)_{10}$—H, $C_{12}H_{25}$—O—$(C_2H_4O)_{10}$—H, $C_{10}H_{21}CH(CH_3)CH_2$—O—$(C_2H_4O)_9$—H, $C_{13}H_{27}$—O—$(C_2H_4O)_9$—$(CH_2CH(CH_3)O)$—H, $C_{16}H_{33}$—O—$(C_2H_4O)_{10}$—H, $HC(C_5H_{11})(C_7H_{15})$—O—$(C_2H_4O)_9$—H, etc.

The content of the nonionic surfactant in the PTFE aqueous dispersion is from 1 to 20 parts by mass, preferably from 2 to 15 parts by mass, more preferably from 2 to 10 parts by mass, further preferably from 3 to 10 parts by mass, particularly preferably from 5 to 10 parts by mass, most preferably from 5 to 8 parts by mass, to 100 parts by mass of the PTFE particles.

When the content of the nonionic surfactant is at least the lower limit value in the above range, excellent dispersion stability of the PTFE aqueous dispersion is obtainable. Also, good wettability is readily obtainable. When it is at most the above upper limit value, defects are less likely to occur in the coating layer. Also, good durability is readily obtainable in the final product.

<Polyether Polysiloxane Copolymer>

The PTFE aqueous dispersion contains a polyether polysiloxane copolymer having a polysiloxane chain and a polyether chain, wherein the polyether chain consists solely of a polyoxypropylene group. The polysiloxane chain may be linear, or it may be branched. A linear chain is preferred.

As the polyether polysiloxane copolymer, for example, compounds represented by the following formulae (3) to (5) may be mentioned. As the polyether polysiloxane copolymer, one type may be used alone, or two or more types may be used in combination.

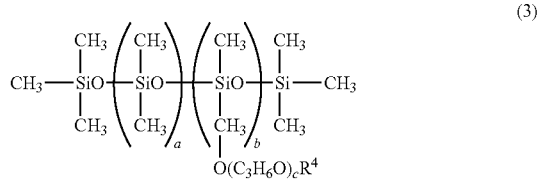

(3)

In the formula (3), $R^4$ is a hydrogen atom or a $C_{1-12}$ alkyl group. Each of a, b and c represents an average repeating number, a is from 0 to 2, b is from 1 to 3, and c is from 16 to 60.

$R^4$ is preferably a hydrogen atom or a $C_{1-3}$ alkyl group, more preferably a hydrogen atom or a methyl group. a is preferably from 0 to 1, b is preferably from 1 to 2, and c is preferably from 16 to 50.

a+b is preferably from 1 to 5, more preferably from 1 to 3.

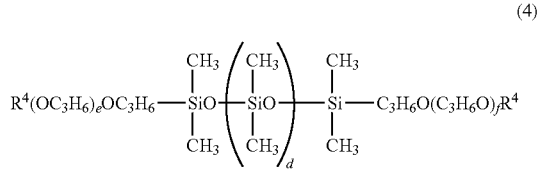

(4)

In the formula (4), $R^4$ is the same as $R^4$ in the formula (3), including preferred embodiments. Each of d, e and f represents an average repeating number, d is from 1 to 3, and the sum of e and f is from 16 to 50.

d is preferably from 1 to 2, and the sum of e and f is preferably from 16 to 40, more preferably from 16 to 32.

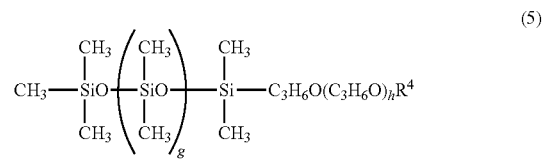

(5)

In the formula (5), $R^4$ is the same as $R^4$ in the formula (3), including preferred embodiments. Each of g and h represents an average repeating number, g is from 1 to 3, and h is from 16 to 60.

g is preferably from 1 to 2, and h is preferably from 16 to 40.

The polyether polysiloxane copolymer preferably contains a compound (4a) which is represented by the above formula (4), wherein $R^4$ is a hydrogen atom or a methyl group, d is from 1 to 2, and the sum of e and f is from 16 to 40. To the total mass of polyether polysiloxane copolymer, the compound (4a) is preferably from 30 to 100 mass %, more preferably from 50 to 100 mass %.

The content of the polyether polysiloxane copolymer in the PTFE aqueous dispersion is from 0.004 to 0.040 parts by mass, preferably from 0.005 to 0.0040 parts by mass, more preferably from 0.006 to 0.040 parts by mass, further preferably from 0.006 to 0.03 parts by mass, particularly preferably from 0.008 to 0.020 parts by mass, to 100 parts by mass of the PTFE particles.

When the content of the polyether polysiloxane copolymer is at least the lower limit value in the above range, being less likely to undergo foaming tends to be better, and when it is at most the upper limit value in the above range, mechanical stability will be better.

<Mineral Oil>

The PTFE aqueous dispersion may contain mineral oil. In the present specification, mineral oil means a hydrocarbon oil derived from a carbonaceous source selected from petroleum oil, natural gas, coal and equivalents thereof. Examples include paraffinic oils and naphthenic oils. Paraffinic oils are preferred, and it is more preferred that the number of carbon atoms is from 12 to 50, and the molecular weight is in the range from 170 to 700. It is further preferred that the number of carbon atoms is from 15 to 35, and the molecular weight is from 200 to 500. Commercially available are paraffinic oils wherein the number of carbon atoms is from 15 to 50, the average molecular weight is from 200 to 700, the kinematic viscosity is from 4 to 70 mm²/S (40° C.), the density is from 0.80 to 0.89 g/mL, and the flash point is from 100 to 300° C.

Specific examples of these paraffinic oils include the following.

Manufactured by MORESCO Corporation, liquid paraffins, trade name: MORESCO WHITE, model number: P-40 (average molecular weight: 230), P-55 (average molecular weight: 300), P-100 (average molecular weight: 365), P-200 (average molecular weight: 430), P-350P (average molecular weight: 480), etc.

The content of mineral oil in the PTFE aqueous dispersion is from 0.001 to 0.01 parts by mass, preferably from 0.001 to 0.008 parts by mass, more preferably from 0.0012 to 0.007 parts by mass, further preferably from 0.0013 to 0.006 parts by mass, particularly preferably from 0.0015 to 0.005 parts by mass, to 100 parts by mass of the PTFE particles.

When the content of mineral oil is at least the lower limit value in the above range, being less likely to undergo foaming tends to be better, and when it is at most the upper limit value in the above range, mechanical stability will be better.

<Compound Represented by the Following Formula (2)>

The PTFE aqueous dispersion may contain a compound represented by the following formula (2) (hereinafter referred to also as a compound (2)). The compound (2) is an acetylenic diol ethoxylate capped with a specific group ($-R^3$).

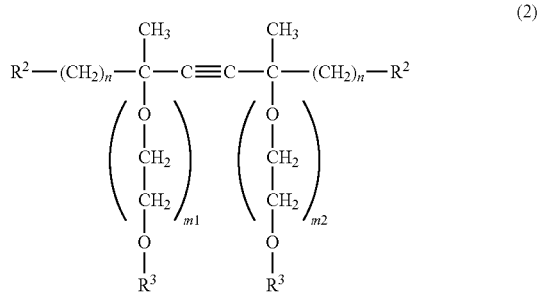

In the formula (2), $R^2$ is a $C_{2-4}$ alkyl group, $R^3$ is a $C_{1-12}$ alkyl group, n is 1 or 2. $m_1$ and $m_2$ each independently represent an average repeating number of oxyethylene groups, and the sum of $m_1$ and $m_2$ is from 2 to 35. The sum of $m_1$ and $m_2$ is preferably from 3 to 15, more preferably from 5 to 10.

The alkyl group for $R^2$ may be either linear or branched, the number of carbon atoms is preferably from 3 to 4, more preferably 3, and —CH(CH$_3$)$_2$ is particularly preferred.

The alkyl group for $R^3$ may be either linear or branched, the number of carbon atoms is preferably from 4 to 18, more preferably from 6 to 10, and a 2-ethylhexyl group is particularly preferred.

As the compound (2), a compound wherein $R^2$ is —CH(CH$_3$)$_2$, and $R^3$ is a 2-ethylhexyl group is more preferred.

As the compound (2), one type may be used alone, or two or more types may be used in combination. In the case of combination, the sum of $m_1$ and $m_2$ may not be an integer, since the sum indicates an average value.

The content of the compound (2) in the PTFE aqueous dispersion is from 0.005 to 0.050 parts by mass, preferably from 0.006 to 0.040 parts by mass, more preferably from 0.007 to 0.035 parts by mass, further preferably from 0.007 to 0.030 parts by mass, particularly preferably from 0.008 to 0.030 parts by mass, to 100 parts by mass of the PTFE particles.

When the content of the compound (2) is at least the lower limit value in the above range, the improving effect for the low foaming property will be better, and when it is at most the upper limit value in the above range, mechanical stability of the PTFE aqueous dispersion will be better.

<Other Surfactants>

The PTFE aqueous dispersion may contain, within a range not to impair the effects of the present invention, other surfactants which do not belong to any of the above fluorinated emulsifier, nonionic surfactant, polyether polysiloxane copolymer and compound (2).

In the case of containing such other surfactants, their content is preferably at most 3 parts by mass, more preferably at most 2 parts by mass, further preferably at most 1 part by mass, to 100 parts by mass of the PTFE particles.

<Water and Other Components>

The PTFE aqueous dispersion contains water as part or whole of the dispersion medium.

Further, it may contain, within a range not to impair the effects of the present invention, components (hereinafter referred to as other components) which do not belong to any of the above PTFE particles, fluorinated emulsifier, nonionic surfactant, polyether polysiloxane copolymer, compound (2), other surfactants, mineral oil and water.

Other components may, for example, be components used in the emulsion polymerization process for the PTFE particles. Further, they may be known additives such as polyethylene glycol or polyurethane-type viscosity modifiers, leveling agents, preservatives, coloring agents, fillers, organic solvents, aqueous ammonia, etc.

The weight average molecular weight of the polyethylene glycol is preferably from 100,000 to 1,500,000, more preferably from 200,000 to 1,000,000.

The polyurethane-type viscosity modifiers may be SN Thickener 621N (trade name, manufactured by San Nopco Limited), ADEKA NOL UH140S (trade name, manufactured by Asahi Denka Kogyo K.K.), etc., and ADEKA NOL UH140S (trade name, manufactured by Asahi Denka Kogyo K.K.) is preferred.

When containing polyethylene glycol or a polyurethane-type viscosity modifier, the PTFE aqueous dispersion will be more excellent in mechanical stability.

The total amount of other components is preferably at most 5 parts by mass, more preferably at most 4 parts by mass, further preferably at most 3 parts by mass, to 100 parts by mass of the PTFE particles.

<Viscosity>

The viscosity at 23° C. of the PTFE aqueous dispersion is preferably from 3 to 300 mPa·s, more preferably from 3 to 100 mPa·s, further preferably from 5 to 50 mPa·s. When the viscosity is at least the lower limit value in the above range, the coating layer will not be too thin at the time of being coated, and when it is at most the upper limit value, it will be easy to adjust the thickness of the coating layer at the time of being coated.

<Production Method>

The PTFE aqueous dispersion of the present invention can be produced by obtaining a PTFE aqueous emulsion by a process of emulsion polymerization using the above fluorinated emulsifier in an aqueous medium, adding a nonionic surfactant to the PTFE aqueous emulsion thereby stabilizing the emulsion, and, after concentrating it or without concentrating it, incorporating a polyether polysiloxane copolymer.

Preferably, the PTFE aqueous emulsion is stabilized by adding a nonionic surfactant thereto, and after concentrating it, or without concentrating it, a polyether polysiloxane copolymer, and at least either mineral oil or compound (2), are incorporated, to obtain a PTFE aqueous dispersion.

[Production of PTFE Aqueous Emulsion]

The PTFE aqueous emulsion can be prepared by a method of letting TFE undergo a polymerization reaction, or letting TFE and at least one type of comonomer undergo a polymerization reaction in the presence of an aqueous medium, a polymerization initiator, the above-mentioned fluorinated emulsifier and a stabilizing aid.

In the case of using a comonomer, its entire amount is preferably charged in the polymerization reaction vessel before the initiation of the polymerization reaction, whereby the particle size of PTFE to be formed tends to become uniform.

As the polymerization conditions, the polymerization temperature is preferably from 10 to 95° C., and the polymerization pressure is preferably from 0.5 to 4.0 MPa. The polymerization time is preferably from 1 to 20 hours.

The amount of the fluorinated emulsifier to be used in the polymerization step is preferably from 1,500 to 20,000 ppm, more preferably from 2,000 to 20,000 ppm, further preferably from 2,000 to 15,000 ppm, to the yield of the final PTFE particles.

As the stabilizing aid, paraffin wax, fluorinated oil, fluorinated solvent, silicone oil or the like is preferred. As the stabilizing aid, one type may be used alone, or two or more types may be used in combination. As the stabilizing aid, paraffin wax is more preferred.

The amount of the stabilizing aid is preferably from 0.1 to 12 mass %, more preferably from 0.1 to 8 mass %, to the aqueous medium to be used.

The stabilizing aid is preferably removed after the emulsion polymerization reaction.

As the polymerization initiator, a water-soluble radical initiator or a water-soluble redox catalyst is preferred. As the water-soluble radical initiator, a persulfate such as ammonium persulfate, potassium persulfate or disuccinic acid peroxide, or a water-soluble organic peroxide such as disuccinic acid peroxide, bisglutalic acid peroxide or tert-butyl hydroperoxide is preferred.

As the polymerization initiator, one type may be used alone, or two or more types may be used in combination. As the initiator, a mixed system of disuccinic acid peroxide and a persulfate is more preferred.

The amount of the polymerization initiator is, usually, preferably from 0.01 to 0.20 mass %, more preferably from 0.01 to 0.15 mass %, to the yield of the final PTFE particles.

In the polymerization process, by letting a chain transfer agent be present in the polymerization system, it is possible to control the molecular weight of PTFE to be formed.

As the chain transfer agent, a chain transfer agent selected from the group consisting of methanol, ethanol, methane, ethane, propane, hydrogen and halogenated hydrocarbons, is preferred, and methanol is more preferred. As the chain transfer agent, two or more types may be used in combination, and in such a case, it is preferred to use methanol as a part thereof.

In the case of using a chain transfer agent, it is preferred to add the chain transfer agent into the polymerization system inbetween after the initiation of the polymerization reaction until completion of the addition of the total amount of TFE to be used in the polymerization. The addition of the chain transfer agent may be either addition all at once, continuous addition, or intermittent addition.

In particular, the chain transfer agent is preferably added at the time when the amount of TFE to be added, has reached from 10 to 95% by mass of the total amount of TFE to be used.

The total amount of the chain transfer agent to be used is, to the yield of the final PTFE particles, preferably from 0.002 to 0.3 mass %, more preferably from 0.005 to 0.3 mass %, particularly preferably from 0.006 to 0.25 mass %.

As the aqueous medium, water, or a mixed liquid of a water-soluble organic solvent and water, is used. As the water, ion exchange water, pure water, ultrapure water, or the like, may be used. As the water-soluble organic solvent, an alcohol (but excluding methanol and ethanol), a ketone, an ether, an ethylene glycol, a propylene glycol or the like may be mentioned. In the polymerization of TFE, as the aqueous medium, water is preferred.

The content of the PTFE particles in the PTFE aqueous emulsion is preferably from 15 to 40 mass %, more preferably from 17 to 35 mass %, particularly preferably from 20 to 30 mass %.

[Concentration of PTFE Aqueous Emulsion and PTFE Aqueous Dispersion]

By incorporating a nonionic surfactant and a polyether polysiloxane copolymer to a PTFE aqueous emulsion obtained by emulsion polymerization, it is possible to obtain a PTFE aqueous dispersion with a low concentration.

Preferably, by incorporating a nonionic surfactant, a polyether polysiloxane copolymer, and at least either mineral oil or the compound (2), to a PTFE aqueous emulsion obtained by emulsion polymerization, it is possible to obtain a PTFE aqueous dispersion with a low concentration.

Further, by adding a nonionic surfactant to the above PTFE aqueous emulsion, followed by concentration by a known method to obtain a concentrated liquid, and by adding a polyether polysiloxane copolymer to the concentrated liquid, it is possible to obtain a PTFE aqueous dispersion with a high concentration.

Preferably, by adding a nonionic surfactant to the above PTFE aqueous emulsion, followed by concentration by a known method to obtain a concentrated liquid, and by adding a polyether polysiloxane copolymer and at least either mineral oil or compound (2) to the concentrated liquid, it is possible to obtain a PTFE aqueous dispersion with a high concentration.

The content of PTFE particles in the PTFE aqueous dispersion with a high concentration, is preferably from 40 to 70 mass %, more preferably from 50 to 70 mass %.

As the concentration method, it is possible to utilize, for example, a known method such as a centrifugal sedimentation method, an electrophoresis method, or a phase separation method, as described on page 32 of Fluororesin Handbook (compiled by Satokawa Takaomi, published by Nikkan Kogyo Shimbun).

In the concentration step, a certain amount of the fluorinated emulsifier and the nonionic surfactant will be removed together with the supernatant.

Also prior to the concentration step, the fluorinated emulsifier may be reduced by a known method. For example, it is possible to use a method of letting it be adsorbed on an anion exchange resin.

The nonionic surfactant is preferably adjusted to a predetermined content by additionally adding it after the concentration step of the PTFE aqueous dispersion.

<Applications>

The PTFE aqueous dispersion of the present invention is used, for example, in the following applications.

Various fluororesin coating processes, and preparations of fluororesin films, fluororesin fibers, etc.

In a coating process, by applying the PTFE aqueous dispersion composition to an object to be coated, a coated article having a PTFE coating layer on the surface will be obtained. The object to be coated (referred to also as the substrate) is not particularly limited, and, for example, various metals, enamel, glass, various ceramics, various heat-resistant resin molded products, etc. may be mentioned.

The above coating is usually carried out by applying the PTFE aqueous dispersion composition of the present invention to a substrate, followed by drying and then by firing. The PTFE aqueous dispersion composition may be applied directly on the substrate, or in order to improve the adhesion to the substrate, a primer layer may be provided, and it may be formed thereon as a top coating layer.

Usually, it is used as a resin molded article being in contact with the object to be coated, or as a resin molded article being in contact with the object to be coated through the primer layer or the like.

The resin molded article may, for example, be a metal cookware, a bearing, a valve, a wire, a metal foil, a boiler, a pipe, a ship bottom, an oven lining, an iron base plate, an ice making tray, a snow shovel, a plow, a chute, a conveyor, a roll, a die, a dice, a tool such as a saw, rasp or a drill, a knife, a scissor, a hopper, other industrial containers (especially for the semiconductor industry), a mold, etc.

Depending on the type of the substrate, it is also possible to obtain a PTFE film by peeling it from the substrate after the above firing. The above PTFE film can be suitably used as a high-frequency printed circuit board, a transfer belt, or a covering material such as packing.

By using, as the substrate, a porous substrate such as a fibrous substrate, a woven fabric, or a nonwoven fabric, it is possible to obtain a product having PTFE impregnated in the substrate.

The fibrous substrate may, for example, be glass fibers, carbon fibers, aramid fibers (Kevlar fibers, etc.), etc. As the woven or nonwoven fabric, for example, a roofing material (tent film) of a membrane structured building, etc. may be mentioned. In a case where optical transparency is desired as the above roofing material, it is preferred to use a modified PTFE as PTFE.

<Function and Mechanism>

As shown in Comparative Example 1 given later, a polytetrafluoroethylene aqueous dispersion which contains a nonionic surfactant, is, although excellent in mechanical stability, likely to undergo foaming when subjected to a shear force of e.g. stirring.

According to the present invention, by incorporating a specific amount of a nonionic surfactant, and incorporating a specific polyether polysiloxane copolymer, to the polytetrafluoroethylene aqueous dispersion, it is possible to suppress foaming, while suppressing a decrease in the mechanical stability.

The reason as to why such an effect is obtainable, is not clear, but it is considered to be attributable to a synergistic effect of the interaction between the surface active effect due to the nonionic surfactant and the surface active effect due to the polyether polysiloxane copolymer.

EXAMPLES

In the following, the present invention will be described in more detail with reference to Examples, but the present invention is not limited to these Examples.

The following measuring methods and evaluation methods were used.

<Average Primary Particle Size of PTFE>

Measured by using a laser scattering particle size distribution analyzer (manufactured by HORIBA, Ltd., LA-920 (product name).

<Content of PTFE Particles>

10 g of the PTFE aqueous dispersion was put in an aluminum dish with a known mass, and heated at 380° C. for 35 minutes, to remove the surfactant, etc., by pyrolysis. The mass of the solid content (PTFE) remaining in the aluminum dish after the heating was adopted as the content of PTFE particles in 10 g of the PTFE aqueous dispersion.

<Content of Fluorinated Emulsifier>

Using LCMS (high performance liquid chromatography provided with mass spectrometer), a calibration curve was prepared from peak areas obtained by using a fluorinated emulsifier at a previously known concentration. Then, a predetermined amount of the PTFE aqueous dispersion as a sample, was dried at 70° C. for 16 hours, and then, the fluorinated emulsifier was extracted with ethanol, whereupon the peak area was measured by LCMS, and the content of the fluorinated emulsifier in the sample was obtained by using the calibration curve.

<Content of Nonionic Surfactant>

10 g of the PTFE aqueous dispersion was put in an aluminum dish with a known mass, and dried at 120° C. for 1 hour, whereupon the mass was measured. The content of the nonionic surfactant was obtained by subtracting the content of the PTFE particles measured by the above-mentioned method, from the mass of the solid content (the nonionic surfactant and the PTFE particles) remaining in the aluminum dish after heating.

<Mechanical Stability Test>

100 g of the PTFE aqueous dispersion was put in a plastic cup having a diameter of 65 mm and an inner volume of 400 ml, and immersed in a water bath at 60° C., whereupon by setting a stirring blade with a diameter 55 mm (FIG. 1), so that the height from the bottom of the plastic cup to the center of the stirring blade (position at 7 mm from the lower end of the stirring blade in the axial direction in FIG. 1 (b)), became to be 20 mm, and by rotating it at 3,000 rpm, the time until the PTFE aqueous dispersion would be aggregated or solidified, and scattered, was measured as a stability retention time.

<Low Foaming Test by Ross Miles Method>

A low foaming test was conducted in accordance with the Ross Miles method in accordance with JIS K3362. Specifically, 50 mL of the PTFE aqueous dispersion was put in a cylinder having an inner diameter of 50 mm, and to this liquid, 200 mL of the PTFE aqueous dispersion was permitted to flow down from a height of 90 cm, from an opening of an inner diameter of 2.9 mm. By the collision of the flown down liquid to the liquid in the cylinder, a foam would be generated. The height (unit: cm) of the foam immediately after finishing of the flowing down of 200 mL, was measured. The smaller the value, the less likely the foaming.

In the following description, the following respective names represent the following components.

Comonomer (1): (perfluorobutyl)ethylene.

Fluorinated emulsifier (1): EEA.

Chain transfer agent (1): methanol.

Nonionic surfactant (1): an aqueous solution with an active ingredient concentration of 90 mass % of a nonionic surfactant represented by $CH_3CH(CH_3)CH_2CH(CH_3)CH_2CH(CH_2CH(CH_3)_2)O(CH_2CH_2O)_{10.1}H$ (product name: TERGITOL TMN100X, manufactured by Dow Chemical Company).

Polyether polysiloxane polymer (1): a compound of the formula (4), wherein $R^4$ is H, d is 1, and the sum of e and f is 22.

Mineral oil (1): manufactured by MORESCO Corporation, liquid paraffin MORESCO WHITE, P-55 (average molecular weight: 300).

Compound (1) represented by the formula (2): a compound of the formula (2), wherein $R^2$ is $—CH(CH_3)_2$, $R^3$ is a 2-ethylhexyl group, n is 1, and $m_1+m_2$ is 8.

Comparative Compound (1): Surfynol (registered trademark) 104E (product name, manufactured by Air Products and Chemicals, Inc., a 50 mass % solution in 2-ethylhexyl alcohol of uncapped acetylenic diol ethoxylate).

Comparative Compound (2): Surfynol (registered trademark) DC110C (product name, manufactured by Air Products and Chemicals, Inc., compound name: 2.5.8.11-tetramethyl-6-dodecyne-5.8-diol).

Comparative Compound (3): TEGO (registered trademark) Foamex 810 (product name, manufactured by Evonik, compound name: octamethylcyclotetrasiloxane).

Comparative Compound (4): TEGO (registered trademark) Wet 270 (product name, manufactured by Evonik, compound name: dimethylsiloxane-ethylene oxide block copolymer).

Comparative Compound (5): Airase (registered trademark) 8070 (product name, manufactured by Air Products and Chemicals, Inc., compound name: 2,4,7,9-tetramethyl-5-decyne-4,7-diol-di(polyoxyethylene) ether).

Production Example 1: Production of PTFE Aqueous Emulsion

Into a 100 L stainless steel autoclave equipped with baffles and a stirrer, 75 g of the fluorinated emulsifier (1), 924 g of paraffin wax, and 59 liters of deionized water were charged. After the autoclave was purged with nitrogen and brought to a reduced pressure, 3.5 g of the comonomer (1) was charged. Further, the pressure was raised by TFE, and the temperature was raised to 79° C. with stirring. Then, the pressure was raised to 1.42 MPa by TFE, and 0.2 g of ammonium persulfate and 26.3 g of disuccinic acid peroxide (concentration: 80 mass %, the rest being water) were dissolved in 1 liter of hot water of about 70° C. and injected to initiate a polymerization reaction. In about 6 minutes, the internal pressure dropped to 1.40 MPa. While adding TFE so that the internal pressure of the autoclave be kept at 1.42 MPa, the polymerization was proceeded. When the amount of TFE added after the initiation of the polymerization became 3.91 kg, 158 g of the fluorinated emulsifier (1) was added. Further, when the amount of TFE added after the initiation of the polymerization became 20.80 kg, 13.9 g of the chain transfer agent (1) was added. Then, when the amount of TFE added after the initiation of the polymerization became 23.11 kg, the reaction was terminated. During this time, the polymerization temperature was raised to 85° C. The polymerization time was 140 minutes.

The obtained PTFE aqueous emulsion was cooled, the supernatant paraffin wax was removed, and the PTFE aqueous emulsion was taken out. A coagulum remained in the reactor was just about a trace. The content of PTFE particles in the obtained PTFE aqueous emulsion was 26.5 mass %. In this Example, the proportion of the total amount (233 g) of the fluorinated emulsifier (1) used, was 10,000 ppm to the mass of PTFE particles.

The average primary particle size of the PTFE fine particles in the obtained PTFE aqueous emulsion was 0.21 µm, and SSG of PTFE was 2.179.

Example 1: Preparation of PTFE Aqueous Dispersion

To the PTFE aqueous emulsion obtained in Production Example 1, the nonionic surfactant (1) was dissolved so that the active ingredient would be 3 parts by mass to 100 parts by mass of the PTFE particles, to obtain a stable aqueous dispersion. Then, into a 5 L beaker, 5 kg of the aqueous dispersion and 200 g of a strongly basic ion exchange resin (manufactured by Purolite, PUROLITE (registered trademark) A300), were put and stirred at room temperature for 12 hours.

Further, the aqueous dispersion was filtrated by a nylon mesh with a mesh size of 100 and then, concentrated by electrophoresis, and the supernatant was removed, to obtain a concentrated liquid wherein the content of the PTFE particles was 66 mass %, and the content of the nonionic surfactant (1) was 2.2 parts by mass to 100 parts by mass of the PTFE particles.

To this concentrated liquid, the nonionic surfactant (1) was added so that the active ingredient would be 4.8 parts by mass to 100 parts by mass of the PTFE particles; the polyether polysiloxane polymer (1), the mineral oil (1) and the compound (1) represented by the formula (2), were added so that the contents would be as shown in Table 1; and water and ammonia in an amount to bring the concentration to be 500 ppm, were added, to obtain a desired PTFE aqueous dispersion.

With respect to the obtained PTFE aqueous dispersion, the mechanical stability test and the low foaming test were carried out by the above-described methods.

The contents of the main components in the obtained PTFE aqueous dispersion, and the test results are shown in Table 1 (the same applies hereinafter).

Examples 2 and 3, Comparative Examples 1 to 10: Preparation of PTFE Aqueous Dispersion In Example 1, compounds added to the concentrated liquid and blend amounts were changed as shown in Tables 1 and 2. Otherwise, in the same manner as in Example 1, a PTFE aqueous dispersion (PTFE high concentration aqueous dispersion) was obtained and evaluated in the same manner.

Comparative Examples 5 to 10 are examples in which as the defoaming agent, a compound commonly known was used.

TABLE 1

| | | Unit | Ex. 1 | Ex. 2 | Ex. 3 | Comp. Ex. 1 | Comp. Ex. 2 | Comp. Ex. 3 | Comp. Ex. 4 |
|---|---|---|---|---|---|---|---|---|---|
| Contents of main components in PTFE aqueous dispersion | PTFE particles | mass % | 58.5 | 58.5 | 58.5 | 58.5 | 58.5 | 58.5 | 58.5 |
| | Fluorinated emulsifier (1) | ppm/PTFE particles | 2 | 2 | 2 | 2 | 2 | 2 | 2 |
| | Nonionic surfactant (1) | Parts by mass/ 100 parts by mass of PTFE particles | 7 | 7 | 7 | 7 | 7 | 7 | 7 |
| | Polyether polysiloxane copolymer (1) | Parts by mass/ 100 parts by mass of PTFE particles | 0.0068 | 0.0137 | 0.0205 | — | 0.0034 | 0.0684 | 0.2735 |
| | Mineral oil (1) | | 0.0017 | 0.0034 | 0.0051 | — | 0.0009 | 0.0171 | 0.0684 |
| | Compound (1) represented by the formula (2) | | 0.0085 | 0.0171 | 0.0256 | — | 0.0043 | 0.0855 | 0.3419 |

TABLE 1-continued

| | | | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|
| | Comparative compound (1) | | — | — | — | — | — | — |
| | Comparative compound (2) | | — | — | — | — | — | — |
| | Comparative compound (3) | | — | — | — | — | — | — |
| | Comparative compound (4) | | — | — | — | — | — | — |
| | Comparative compound (5) | | — | — | — | — | — | — |
| Viscosity of PTFE aqueous dispersion (23° C.) | | mPa · s | 18.5 | 15.3 | 21.6 | 15.6 | 16.9 | 18.1 | 23.0 |
| Low foaming test | Height of foaming | cm | 3.5 | 1.5 | 1 | 16.5 | 13 | <0.5 | <0.5 |
| Mechanical stability test | Stability retention time | min | 69 | 64 | 60 | 81 | 71 | 37 | 31 |

| | | Unit | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|
| Contents of main components in PTFE aqueous dispersion | PTFE particles | mass % | 58.5 | 58.5 | 58.5 | 58.5 | 58.5 | 58.5 |
| | Fluorinated emulsifier (1) | ppm/PTFE particles | 2 | 2 | 2 | 2 | 2 | 2 |
| | Nonionic surfactant (1) | Parts by mass/ 100 parts by mass of PTFE particles | 7 | 7 | 7 | 7 | 7 | 7 |
| | Polyether polysiloxane copolymer (1) | Parts by mass/ 100 parts by mass of PTFE particles | — | — | — | — | — | — |
| | Mineral oil (1) | | — | — | — | — | — | — |
| | Compound (1) represented by the formula (2) | | 0.0171 | — | — | — | — | — |
| | Comparative compound (1) | | — | 0.1709 | — | — | — | — |
| | Comparative compound (2) | | — | — | 0.1709 | — | — | — |
| | Comparative compound (3) | | — | — | — | 0.0855 | — | — |
| | Comparative compound (4) | | — | — | — | — | 0.8547 | — |
| | Comparative compound (5) | | — | — | — | — | — | 0.8547 |
| Viscosity of PTFE aqueous dispersion (23° C.) | | mPa · s | 16.3 | 18.3 | 45.0 | 15.7 | 34.6 | 42.5 |
| Low foaming test | Height of foaming | cm | 16 | 17 | 17 | 8.5 | 15.5 | 16 |
| Mechanical stability test | Stability retention time | min | 67 | 65 | 60 | 57 | 52 | 47 |

From the evaluation results in Table 1, it is evident that the PTFE aqueous dispersions in Examples 1 to 3 are excellent in mechanical stability, and at the same time, they are less likely to undergo foaming.

This application is a continuation of PCT Application No. PCT/JP2018/016476, filed on Apr. 23, 2018, which is based upon and claims the benefit of priority from Japanese Patent Application No. 2017-090702 filed on Apr. 28, 2017. The contents of those applications are incorporated herein by reference in their entireties.

What is claimed is:

1. A polytetrafluoroethylene aqueous dispersion characterized by containing from 15 to 70 mass % of polytetrafluoroethylene particles having an average primary particle size of from 0.1 to 0.5 μm, from 0.1 to 20,000 ppm, to the mass of the polytetrafluoroethylene particles, of a fluorinated emulsifier selected from the group consisting of a $C_{4-7}$ fluorinated carboxylic acid which may have an etheric oxygen atom, and salts thereof, from 1 to 20 parts by mass, to 100 parts by mass of the polytetrafluoroethylene particles, of a nonionic surfactant represented by the following formula (1), from 0.004 to 0.040 parts by mass, to 100 parts by mass of the polytetrafluoroethylene particles, of a polyether polysiloxane copolymer having a polysiloxane chain and a polyether chain, wherein the polyether chain consists solely of a polyoxypropylene group, and water, $$R^1-O-A-H \quad (1)$$

wherein $R^1$ is a $C_{8-18}$ alkyl group, and A is a polyoxyalkylene chain composed of oxyethylene groups in the average repeating number of from 5 to 20 and oxypropylene groups in the average repeating number of from 0 to 2.

2. The polytetrafluoroethylene aqueous dispersion according to claim 1, which further contains from 0.001 to 0.010 parts by mass, to 100 parts by mass of the polytetrafluoroethylene particles, of a mineral oil.

3. The polytetrafluoroethylene aqueous dispersion according to claim 1, which further contains from 0.005 to 0.050 parts by mass, to 100 parts by mass of the polytetrafluoroethylene particles, of a compound represented by the following formula (2),

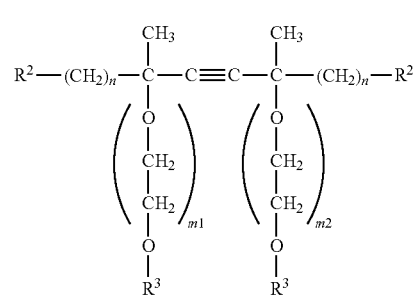

wherein $R^2$ represents a $C_{2-4}$ alkyl group, $R^3$ represents a $C_{1-12}$ alkyl group, n is 1 or 2, $m_1$ and $m_2$ each independently represent the average repeating number of oxyethylene groups, and the total of $m_1$ and $m_2$ is from 2 to 35.

4. The polytetrafluoroethylene aqueous dispersion according to claim 1, wherein the fluorinated emulsifier is a fluorinated emulsifier selected from the group consisting of a $C_{4-7}$ fluorinated carboxylic acid which has from 1 to 4 etheric oxygen atoms, and salts thereof.

5. The polytetrafluoroethylene aqueous dispersion according to claim 1, wherein in the formula (1), the number of carbon atoms in $R^1$ is from 10 to 16, and A is a polyoxyalkylene chain composed of oxyethylene groups in the average repeating number of from 7 to 12 and oxypropylene groups in the average repeating number of from 0 to 2.

6. The polytetrafluoroethylene aqueous dispersion according to claim 1, which contains the nonionic surfactant represented by the formula (1) in an amount of from 2 to 10 parts by mass to 100 parts by mass of the polytetrafluoroethylene particles.

7. The polytetrafluoroethylene aqueous dispersion according to claim 1, wherein the polytetrafluoroethylene particles are particles of a non-melt-moldable polytetrafluoroethylene.

8. The polytetrafluoroethylene aqueous dispersion according to claim 7, wherein the particles of a non-melt-moldable polytetrafluoroethylene are particles of a modified polytetrafluoroethylene which is a copolymer of tetrafluoroethylene and a copolymerizable comonomer.

9. The polytetrafluoroethylene aqueous dispersion according to claim 8, wherein the comonomer is a (perfluoroalkyl)ethylene wherein the number of carbon atoms in the perfluoroalkyl moiety is at most 8.

10. The polytetrafluoroethylene aqueous dispersion according to claim 7, wherein the polytetrafluoroethylene particles are particles of a modified polytetrafluoroethylene wherein the content of structural units based on a comonomer to all structural units is at most 0.5 mass %.

11. The polytetrafluoroethylene aqueous dispersion according to claim 1, wherein the polyether polysiloxane copolymer is at least one member selected from compounds represented by the following formulae (3) to (5),

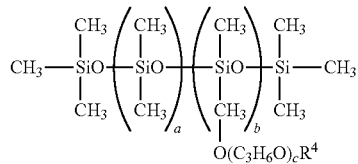

(3)

wherein $R^4$ represents a hydrogen atom or a $C_{1-12}$ alkyl group, a, b and c each represent the average repeating number, a is from 0 to 2, b is from 1 to 3, and c is from 16 to 60,

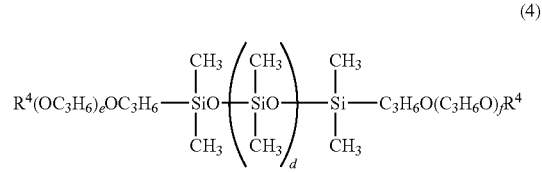

(4)

wherein $R^4$ represents a hydrogen atom or a $C_{1-12}$ alkyl group, d, e and f each represent the average repeating number, d is from 1 to 3, and the sum of e and f is from 16 to 50,

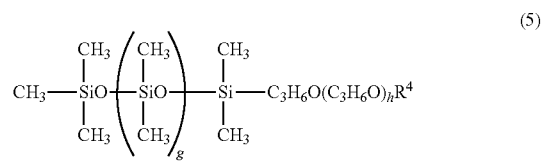

(5)

wherein $R^4$ represents a hydrogen atom or a $C_{1-12}$ alkyl group, g and h each represent the average repeating number, g is from 1 to 3, and h is from 16 to 60.

12. The polytetrafluoroethylene aqueous dispersion according to claim 1, which contains the polyether polysiloxane copolymer in an amount of from 0.005 to 0.040 parts by mass to 100 parts by mass of the polytetrafluoroethylene particles.

13. The polytetrafluoroethylene aqueous dispersion according to claim 1, which has a viscosity at 23° C. of from 3 to 300 mPa·s.

* * * * *